(12) United States Patent
Franklin et al.

(10) Patent No.: US 8,327,871 B1
(45) Date of Patent: Dec. 11, 2012

(54) MULTI-VALVE CARTRIDGE PRESSURE REGULATOR

(75) Inventors: Douglas M. Franklin, Cullman, AL (US); John W. Brill, Cullman, AL (US)

(73) Assignee: Reliance Worldwide Corporation, Cullman, AL (US)

( * ) Notice: Subject to any disclaimer, the term of this patent is extended or adjusted under 35 U.S.C. 154(b) by 298 days.

(21) Appl. No.: 12/814,192

(22) Filed: Jun. 11, 2010

Related U.S. Application Data

(60) Provisional application No. 61/186,522, filed on Jun. 12, 2009.

(51) Int. Cl.
*F17D 1/00* (2006.01)
*G05D 16/00* (2006.01)
(52) U.S. Cl. ............... 137/271; 137/613; 137/505.36
(58) Field of Classification Search .......... 137/269, 137/271, 613, 454.2, 454.5, 505, 505.36, 137/884
See application file for complete search history.

(56) References Cited

U.S. PATENT DOCUMENTS

| | | | | |
|---|---|---|---|---|
| 2,067,229 | A * | 1/1937 | Birch | 137/613 |
| 3,825,225 | A * | 7/1974 | Demi | 137/454.5 |
| 4,424,830 | A * | 1/1984 | Arnsperger et al. | 137/613 |
| 5,988,217 | A * | 11/1999 | Ohmi et al. | 137/613 |
| 6,012,479 | A * | 1/2000 | Fukushima et al. | 137/271 |
| 6,216,739 | B1 * | 4/2001 | Fukushima et al. | 137/884 |
| 7,066,203 | B2 * | 6/2006 | Baarda | 137/613 |
| 7,275,559 | B2 | 10/2007 | Morrison et al. | |

* cited by examiner

*Primary Examiner* — Kevin Lee
(74) *Attorney, Agent, or Firm* — Gerald M. Walsh; Kenneth M. Bush; Bush Intellectual Property Law

(57) ABSTRACT

A pressure regulator having a conduit with a plurality of adjustable valves inserted reversibly into the conduit. The valves are aligned along the axis of water flow. The interior of the conduit is divided into an inlet chamber and outlet chamber by a septum. The valves are inserted into the inlet chamber, and valve seats protrude through holes in the septum into the outlet chamber, thereby sealing the inlet chamber from the outlet chamber. Fluid flows into the conduit, into the inlet chamber, through the open valve, into the outlet chamber, and then flows out of the conduit. The valves regulate fluid pressure in the outlet chamber. The degree of pressure regulation can be adjusted for each valve by turning pressure adjustment knobs on the top of the valves to produce precise regulation of pressure and fluid flow. A conduit plug can replace a valve in the conduit.

10 Claims, 5 Drawing Sheets

MULTI-VALVE CARTRIDGE PRESSURE REGULATOR

CROSS-REFERENCE TO RELATED APPLICATION

The present application claims priority to U.S. Provisional Patent Application No. 61/186,522, filed Jun. 12, 2009, the disclosure of which is incorporated herein by reference.

FIELD OF THE INVENTION

The present invention relates to pressure regulators for fluids and, more particularly, to a pressure regulator that has a plurality of adjustable pressure and flow control valves with diaphragm chambers, the valves being positioned in a conduit having an inlet chamber and an outlet chamber.

BACKGROUND OF THE INVENTION

In many fluid delivery systems overpressure protection is needed to prevent damage to pipes, conduits, vessels, and the like that may result from excessive fluid pressures. In some cases is it desirable to have a plurality of pressure regulating valves in parallel or in series in order to convey the required flow capacity with reasonably accurate pressure regulation, but this type of system may be complex, expensive and difficult to install and maintain.

What is needed is a single, easy to install, pressure regulator that will provide for a high flow rate yet allow precise regulation of fluid pressure with simple variable pressure control devices that are modular and thus easy to replace.

SUMMARY OF THE INVENTION

The present invention is a fluid pressure regulator having a conduit with an inlet port, an outlet port, and an internal septum dividing the interior of the conduit into an inlet chamber and an outlet chamber. The inlet port opens only into the inlet chamber and the outlet port opens only into the outlet chamber. The conduit has two or more conduit openings for the reversible insertion of valves or valve cartridges, and the septum has two or more septum openings for reversible insertion of valves. The valves seal the inlet chamber from the outlet chamber when they are placed within the conduit. The valve cartridge has a spring, a seat disc, and a valve seat. The spring exerts a pushing force to push the seat disc away from the valve seat to open the valve.

The valve has a diaphragm creating a diaphragm chamber in communication with the outlet chamber and with the fluid and pressure therein. The valve has a piston which isolates the diaphragm chamber from the inlet chamber and the fluid and pressure therein. The diaphragm pushes against the spring when pressure in the outlet chamber exceeds the pushing force of the spring, thereby causing the seat disc to be pulled into the valve seat to close the valve. The seat disc and the valve seat are positioned within the outlet chamber. The diaphragm chamber is connected to an outlet pressure sensing port which is in contact with fluid and pressure in the outlet chamber.

The valve has a pressure adjustment knob at a top end of the valve, a pressure adjustment screw, and a numeric pressure indicating disc. The pressure adjustment knob is rotatable clockwise or counterclockwise to adjust the degree of tension in the spring by compressing or decompressing the spring. The greater the tension in the spring the greater the fluid pressure required to move the seat disc into the valve seat to close the valve to disrupt the flow of water through the valve.

By adjusting the pressure adjustment knobs the pressure drop from the inlet port to the outlet port can be adjusted very precisely and accurately. When maintenance is required, one or more of the valve cartridges can be removed from the conduit without removing the conduit from the pipes or tubing to which it is connected at the inlet port and at the outlet port.

An advantage of the present invention is flow capacity enhanced though specific alignment of the valve cartridges.

Another advantage is flow control accuracy through independent pressure adjustment of a plurality of valve cartridges.

Another advantage is flow capacity expandability by the use of valve cartridge plugs which can be fitted in place of valve cartridges to limit flow and allow for future flow expandability.

Another advantage is the use of multiple valve cartridges which allows for each valve to be adjusted to regulate pressure independently and open or close sequentially, dependent upon the immediate flow requirement.

Another advantage is that the independently adjustable valve cartridges allow the pressure regulator to control the flow of water with a high level of precision, offering superior durability with little required maintenance.

Another advantage is that variations in inlet pressure do not affect regulated outlet pressure as long as inlet pressure remains greater than the set pressure.

DETAILED DESCRIPTION OF THE INVENTION

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Figure 1:
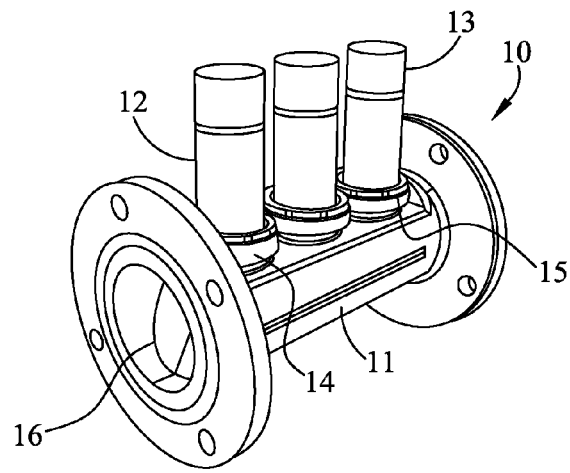
FIG. 1 shows an illustration of the multi-cartridge pressure regulator of the present invention.

FIG. 1 shows an illustration of the multi-cartridge pressure regulator 10 of the present invention. The pressure regulator 10 has a conduit 11 and has three valves or valve cartridges 12 on top of conduit 11 wherein the valve cartridges 12 are aligned, preferably, sequentially and in series along the axis of fluid flow. This alignment of the valve cartridges 12 allows for greatest flow of water through the pressure regulator 10. Each valve cartridge 12 has a pressure adjustment knob 13.

Figure 2:
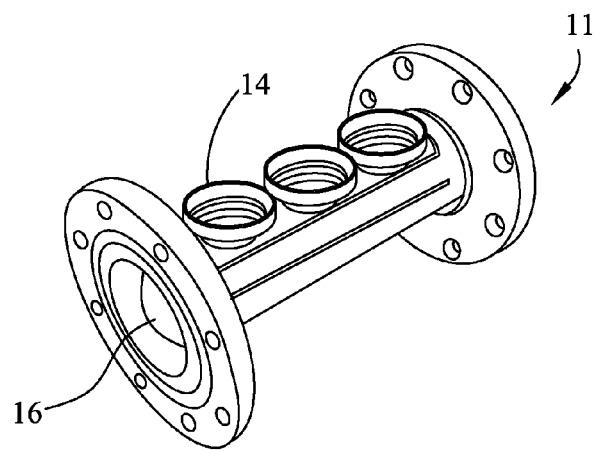
FIG. 2 shows the conduit of the pressure regulator with the valve cartridges removed.
Figure 3:
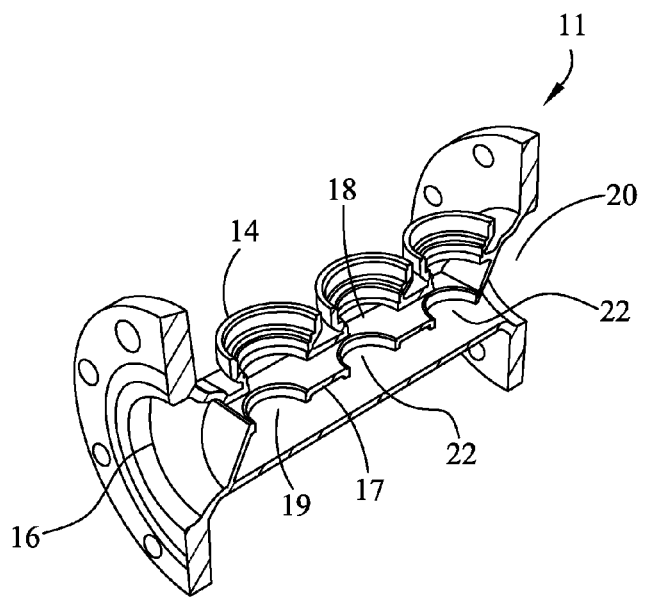
FIG. 3 shows a bisected view of the conduit further showing the internal septum within the conduit, dividing the conduit into an inlet chamber and an outlet chamber.

Conduit 11 has three openings with threaded bases 14 for reversible attachment of the valve cartridges 12. These openings are also aligned, preferably, sequentially and in series along the axis of fluid flow. This alignment of the openings and valve cartridges 12 allows for the greatest flow through the conduit 11. The valve cartridges 12 are attached to the threaded bases 14 by means of threaded nut 15. Conduit 11 has an inlet port 16 on one end. FIG. 2 shows the conduit 11 with valve cartridges 12 removed. FIG. 3 shows a bisected view of conduit 11 further showing an outlet port 20. The internal portion of conduit 11 has an internal septum 17 which divides the internal portion of conduit 11 into an upper (or inlet) chamber 18 and into a lower (or outlet) chamber 19. The inlet port 16 opens only into the inlet chamber 18 and the outlet port 20 opens only into the outlet chamber 19. Septum 17 has three holes or openings 22.

Figure 4:
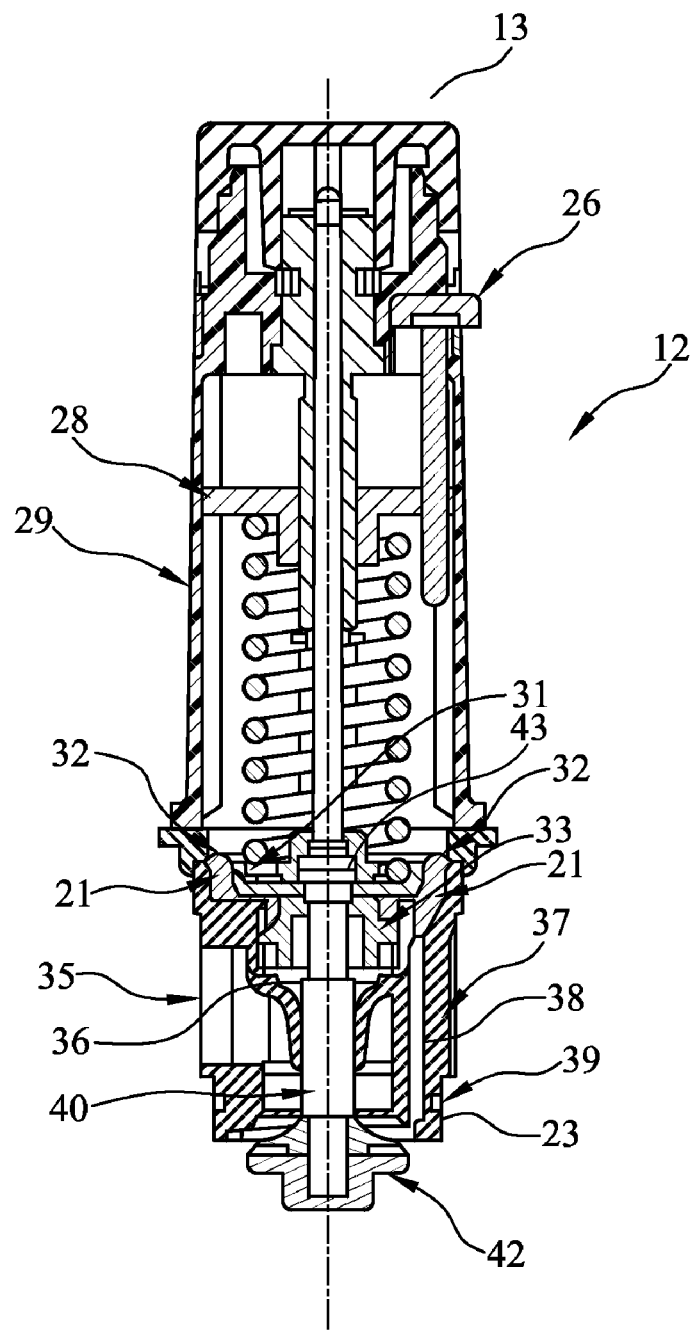
FIG. 4 illustrates a typical valve system or cartridge that may be used with the pressure regulator of the present invention.

FIG. 4 illustrates a typical valve system or cartridge 12 that may be used with the pressure regulator 10 of the present invention. Valve cartridge 12 has a pressure adjustment knob 13 at the top and a valve seat 23 at the bottom. Valve seat 23 includes a seat disc 41 and a seat shell 42. Valve 12 further has a numeric pressure indicating disc 26, a pressure adjustment screw 27, a spring button 28, a spring chamber 29, a pressure spring 30, a pressure plate 31, a diaphragm 32, a piston 33, a u-cup seal 34, a strainer screen 35, a retainer 36, a body seat or insert 37, an outlet pressure sensing port 38, an o-ring 39, and a pull rod 40. There is a diaphragm chamber 21 between the piston 33 and the diaphragm 32. The pressure plate 31, diaphragm 32, piston 33, u-cup seal 34 and retainer 36 are secured to the upper end of the pull rod 40 by way of threaded nut 43. The seat disc 41 is secured to the lower end of pull rod 40 by way of threaded seat shell 42. When all parts are secured to the pull rod 40, they combine to form a pull rod sub-assembly that functions in a cohesive manner.

Figure 5:
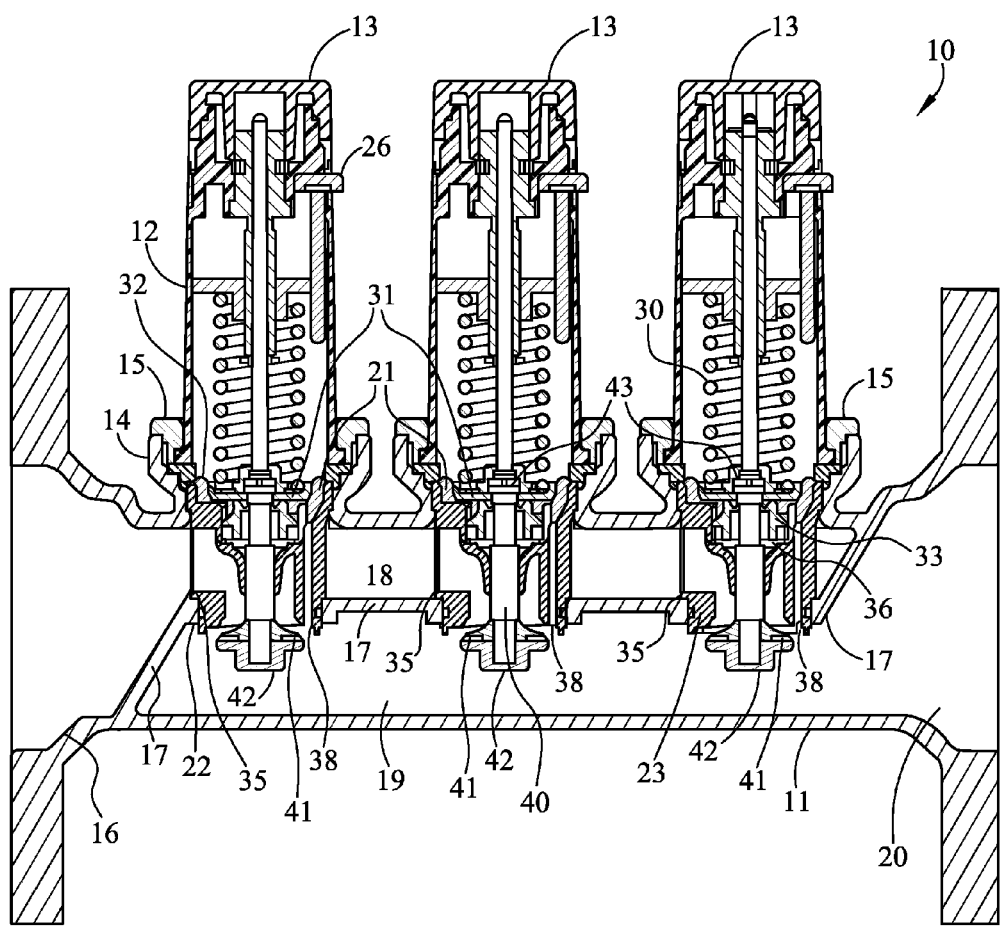
FIG. 5 shows a side cross-sectional view of the multi-valve pressure regulator of the present invention.
Figure 6:
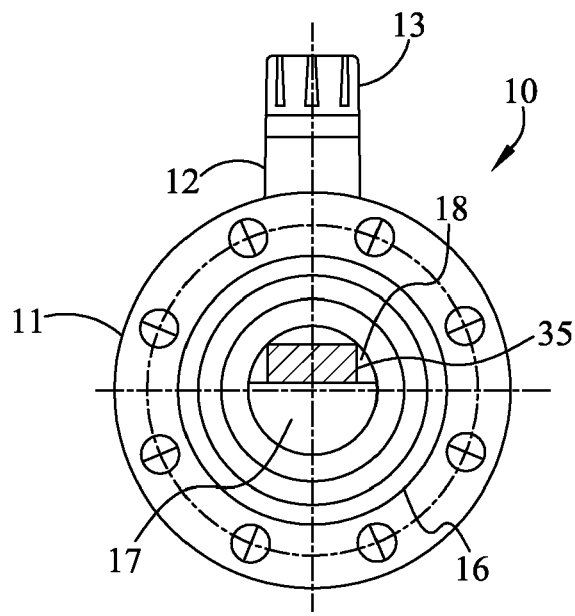
FIG. 6 shows an end view of the pressure regulator from the inlet end.
Figure 7:
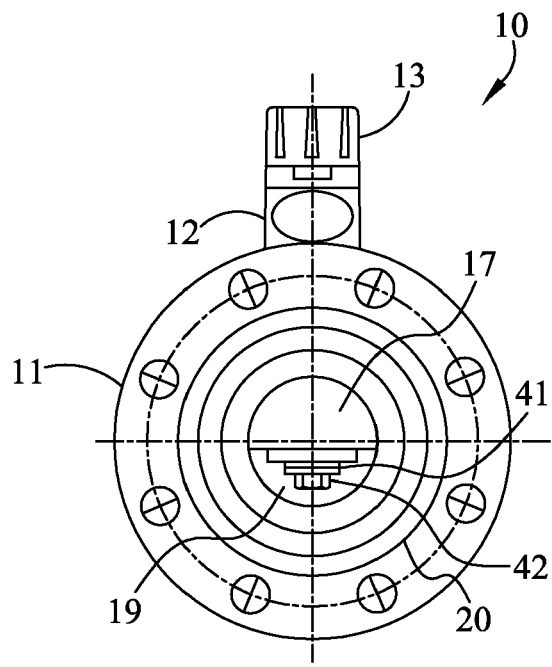
FIG. 7 shows an end view of the pressure regulator from the outlet end.

FIG. 5 shows a side cross-sectional view of the pressure regulator 10. FIG. 6 shows an end view of the pressure regulator 10 from the inlet end 16, and FIG. 7 shows an end view of the pressure regulator 10 from the outlet end 20. Spring 30 pushes down on the pressure plate 31 which is connected to the piston 33. When piston 33, attached to the upper end of pull rod 40, is pushed down the pull rod 40 is pushed down, and the seat disc 41 is pushed down, away from the valve seat 23, which opens valve 12. The diaphragm 32 is between the pressure plate 31 and the piston 33. The diaphragm 32 creates the diaphragm chamber 21 around the piston 33. The diaphragm chamber 21 is in communication with the outlet sensing port 38 which is open to the outlet chamber 19 and to the fluid and pressure therein. If the pressure in outlet chamber 19 is greater than the force of spring 30 pushing on pressure plate 31, then that pressure pushes upon diaphragm 32, upon pressure plate 31, and upon spring 30, thereby pulling up on pull rod 40 and pulling seat disc 41 into valve seat 23, which closes valve 12.

Water pressure at the inlet 16 will cause water to flow into inlet chamber 18, then through strainer screens 35 and pass the valve seat 23, thereby filling the outlet chamber 19 and filling the diaphragm chamber 21 through the outlet pressure sensing ports 38. The water will continue to flow until pressure increases sufficiently to cause the diaphragm 32 to oppose the downward force from the pressure spring 30 and lift the seat disc 41 into the valve seat 23 by way of the pull rod 40 and pull rod sub-assembly. The valve cartridges 12 are placed into the threaded bases 14, and the valve seats 23 project through the septum openings 22. As threaded nut 15 is screwed into the threaded base 14 the valve cartridges 12 are sealed in the threaded bases 14 and the valve seats 23 are sealed in the septum 17. The inlet chamber 18 is thus sealed from the outlet chamber 19. The valve seats 23 and seat discs 41 are positioned within the outlet chamber 19, and the pressure sensing ports 38 are in contact with the fluid and fluid pressure in the outlet chamber 19.

The pressure adjustment knobs 13 can be rotated clockwise or counter clockwise to adjust the degree of tension in the pressure spring 30 by compressing or decompressing the spring 30. The greater the tension in pressure spring 30 the greater the pressure the water must have to move the seat disc 41 into the valve seat 23 to disrupt the flow of water through the valve 12. Thus, the greater the tension in pressure spring 30 the greater the pressure in the outlet chamber 19. By adjusting the pressure adjustment knobs 13 the pressure drop from the inlet port 16 to the outlet port 20 can be adjusted very precisely and accurately. When maintenance is required, one or more of the valve cartridges 12 can be removed from the threaded base 14 by unscrewing the threaded nut 15, without removing the conduit 11 from the pipes or tubing to which it is connected at the inlet port 16 and at the outlet port 20.

The purpose of the valve cartridges 12 is to regulate and reduce pressure on the outlet side 20 of the conduit 11. When a pressure regulator 10 of the present invention is initially installed and commissioned it is normally in the full open position allowing water to flow through the device uninterrupted. The valve 12 is held in the full open position by the pressure spring 30. Pressure rises when the system is filled. This rise in pressure results in an increase in the upward force against the diaphragm 32 which may eventually exceed the downward force from the pressure spring 30 causing the valve 12 to close. When a tap is opened downstream, a reduction in outlet pressure is produced. This pressure reduction effectively decreases the force against the diaphragm 32 and the pressure spring 30 takes over again causing the valve 12 to open until demand for water is satisfied. Key components of the valve cartridge 12 include the diaphragm 32 and pressure spring 30. The piston 33, along with the u-cup seal 34, serve only to isolate the diaphragm chamber 21 from the inlet chamber 18 and the fluid and pressure therein, and do not directly cause the valve 12 to open or close. The use of multiple valve cartridges 12 allows for each to be adjusted to regulate pressure independently and open or close sequentially, depending upon the immediate flow requirement. The plurality of independently adjustable valves allows the overall pressure regulator 10 to control the flow of water with a higher level of precision than conduits fitted with a single valve. In addition, the use of valve cartridges 12 offers great durability with little required maintenance. Variations in inlet pressure do not in any way affect regulated outlet pressure (or set pressure) provided, of course, that inlet pressure remains greater than the set pressure.

Figure 8:
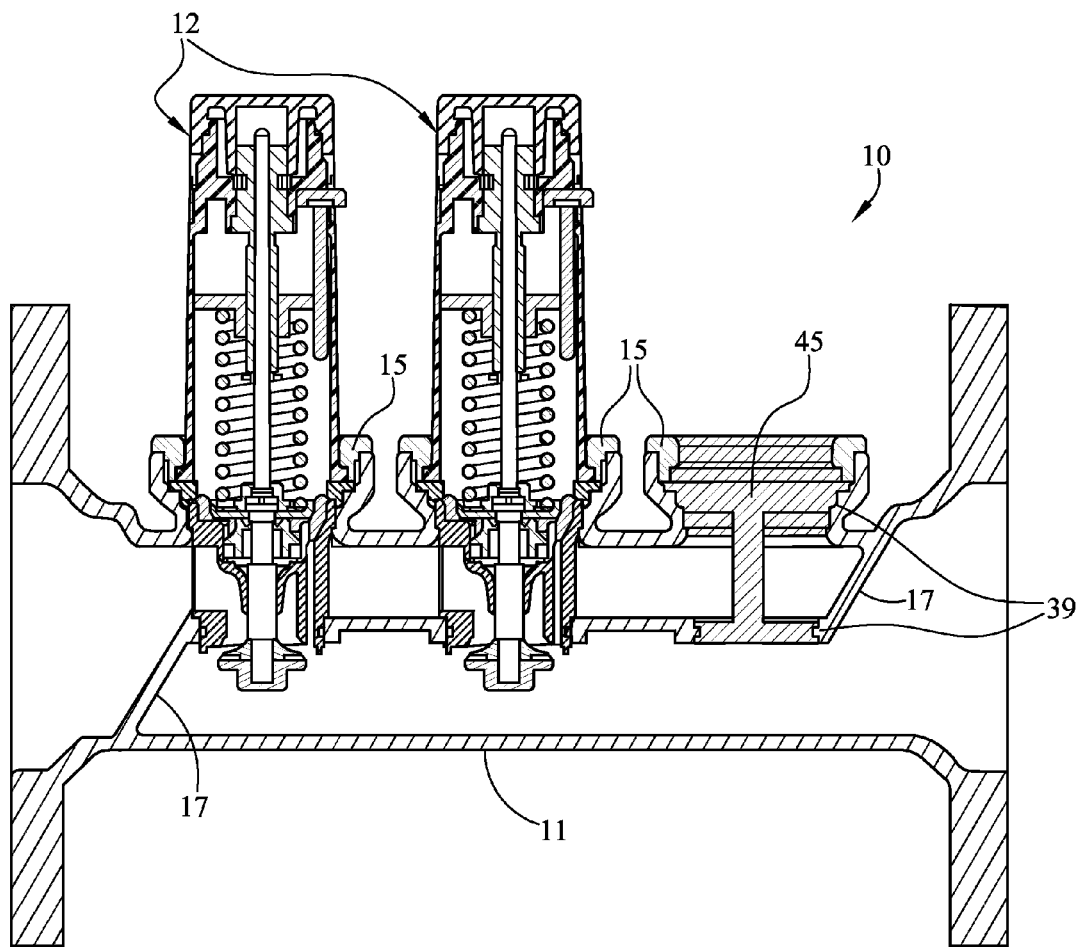
FIG. 8 shows a side cross-sectional view of the pressure regulator in which one of the valve cartridges has been replaced with a cartridge plug.

FIG. 8 shows a side cross-sectional view of the pressure regulator 10 in which one of the valve cartridges 12 has been replaced with a conduit plug (cartridge plug) 45. One or more of the valve cartridges 12 are replaceable with cartridge plugs 45, reversibly insertable into the conduit openings. The cartridge plug 45 is secured by means of threaded nut 15 and effectively seals the openings in both the internal and external portions of the conduit 11 by means of o-rings 39. The maximum flow capability of the pressure regulator 10 can be limited or reduced through the use of the cartridge plug 45 which can be fitted in place of one or more of the valve cartridges 12. This will allow the regulator 10 to function more effectively when flow requirements are minimal yet allow for expansion as future demand for water increases.

The foregoing description has been limited to specific embodiments of this invention. It will be apparent, however, that variations and modifications may be made, by those skilled in the art, to the disclosed embodiments of the invention, with the attainment of some of all of its advantages and without departing from the spirit and scope of the present invention. For example, the pressure regulator can be constructed of metal or plastic or a combination thereof. The pressure regulators can be used in series or in parallel or both in pipes and tubing. One or more valve cartridges can be used in a single pressure regulator. The pressure regulators will regulate both liquid and gas flow.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A fluid pressure regulator, comprising:
   a) a conduit having an inlet port, an outlet port, and an internal septum dividing the interior of said conduit into an inlet chamber and an outlet chamber, wherein the inlet port opens only into the inlet chamber and the outlet port opens only into the outlet chamber;
   b) said conduit having two or more conduit openings and the septum having two or more septum openings, with a valve cartridge reversibly inserted into each of said conduit openings and with said valve cartridges extending through said septum openings, wherein said valve cartridges seal the inlet chamber from the outlet chamber within said conduit;
   c) each said valve cartridge having a spring, a seat disc, and a valve seat, wherein the spring exerts a pushing force to push the seat disc away from the valve seat to open said valve cartridge to said outlet chamber;
   d) each said valve cartridge having a diaphragm creating a diaphragm chamber in said valve cartridge, wherein said diaphragm chamber is in communication with said outlet chamber and with the fluid and pressure therein when said valve cartridge is open to said outlet chamber;
   e) said valve cartridge having a piston which isolates the diaphragm chamber from the inlet chamber and the fluid and pressure therein; and
   f) each said valve cartridge and the conduit openings are aligned sequentially and in series along the axis of fluid flow, wherein one or more said valve cartridges are replaceable with a conduit plug reversibly insertable into the conduit openings, and wherein the maximum flow capability of the fluid pressure regulator is limited or reduced through the use of said conduit plug.

2. The fluid pressure regulator of claim 1, further comprising the diaphragm pushing against the spring when pressure in the outlet chamber exceeds the pushing force of the spring, thereby causing the seat disc to be pulled into the valve seat to close said valve cartridge.

3. The fluid pressure regulator of claim 1 wherein the seat disc and the valve seat are positioned within the outlet chamber.

4. The fluid pressure regulator of claim 1 wherein the diaphragm chamber is connected to an outlet pressure sensing port which is in contact with fluid and pressure in the outlet chamber.

5. The fluid pressure regulator of claim 1 wherein the piston has a pull rod whereby the seat disc is pulled into the valve seat or is pushed away from the valve seat.

6. The fluid pressure regulator of claim 1 wherein said valve cartridge has a pressure adjustment knob at a top end of said valve cartridge, a pressure adjustment screw, and a numeric pressure indicating disc; wherein the pressure adjustment knob is rotatable clockwise or counterclockwise to adjust the degree of tension in the spring by compressing or decompressing the spring; wherein the greater the tension in the spring the greater the fluid pressure required to move the seat disc into the valve seat to close the valve cartridge to disrupt the flow of water through said valve cartridge; and wherein each valve cartridge is independently adjustable to regulate pressure independently and to open or close sequentially.

7. The fluid pressure regulator of claim 1 wherein said valve cartridge has a pressure adjustment knob at a top end of said valve cartridge, a pressure adjustment screw, and a numeric pressure indicating disc; wherein the pressure adjustment knob is rotatable clockwise or counterclockwise to adjust the degree of tension in the spring by compressing or decompressing the spring; wherein the greater the tension in the spring the greater the fluid pressure required to move the seat disc into the valve seat to close the valve cartridge to disrupt the flow of water through said valve cartridge; and wherein each valve cartridge is independently adjustable to regulate pressure independently and to open or close sequentially.

8. A fluid pressure regulator, comprising:
   a) a conduit having an inlet port, an outlet port, and an internal septum dividing the interior of said conduit into an inlet chamber and an outlet chamber, wherein the inlet port opens only into the inlet chamber and the outlet port opens only into the outlet chamber;
   b) said conduit having two or more conduit openings and the septum having two or more septum openings, with a valve cartridge reversibly inserted into each of said conduit openings and with said valve cartridges extending through said septum openings, wherein said valve cartridges seal the inlet chamber from the outlet chamber within said conduit;
   c) each said valve cartridge having a spring, a seat disc, and a valve seat, wherein the spring exerts a pushing force to push the seat disc away from the valve seat to open said valve cartridge to said outlet chamber;
   d) each said valve cartridge having a diaphragm creating a diaphragm chamber in said valve cartridge, wherein said diaphragm chamber is in communication with said outlet chamber and with the fluid and pressure therein when said valve cartridge is open to said outlet chamber;
   e) said valve cartridge having a piston which isolates the diaphragm chamber from the inlet chamber and the fluid and pressure therein;
   f) said diaphragm pushing against the spring when pressure in the outlet chamber exceeds the pushing force of the spring, thereby causing the seat disc to be pulled into the valve seat to close said valve cartridge;
   g) the seat disc and the valve seat are positioned within the outlet chamber; and
   h) each said valve cartridge and the conduit openings are aligned sequentially and in series along the axis of fluid flow, wherein one or more said valve cartridges are replaceable with a conduit plug reversibly insertable into the conduit openings, and wherein the maximum flow capability of the fluid pressure regulator is limited or reduced through the use of said conduit plug.

9. The fluid pressure regulator of claim 8 wherein the diaphragm chamber is connected to an outlet pressure sensing port which is in contact with fluid and pressure in the outlet chamber.

10. The fluid pressure regulator of claim 9 wherein the piston has a pull rod whereby the seat disc is pulled into the valve seat or is pushed away from the valve seat.

* * * * *